United States Patent

[11] 3,615,828

[72] Inventor Albert K. Fischer
 Western Springs, Ill.
[21] Appl. No. 17,404
[22] Filed Mar. 9, 1970
[45] Patented Oct. 26, 1971
[73] Assignee The United States of America as represented by the United States Atomic Energy Commission

[54] SECONDARY POWER-PRODUCING CELL
 4 Claims, 1 Drawing Fig.
[52] U.S. Cl. .............................................. 136/6, 136/20
[51] Int. Cl. .............................................. H01m 35/02
[50] Field of Search ...................................... 136/6, 20, 83, 164, 165, 100, 23, 24, 30, 25

[56] References Cited
 UNITED STATES PATENTS
1,182,513  5/1916  Thofehrn ..................... 136/20
1,980,606  11/1934  Almeida ...................... 136/20
3,419,435  12/1968  Recht et al ................... 136/6
3,492,160  1/1970  Silver ......................... 136/6

Primary Examiner—Winston A. Douglas
Assistant Examiner—C. F. LeFevour
Attorney—Roland A. Anderson ABSTRACT: A secondary power-producing cell consists of an anode and a cathode formed of binary compounds containing the same two elements in different stoichiometric proportions, the electrodes being separated by an electrolyte containing ions of the element that is to be transported therethrough. During operation ions of the electropositive component of the electrode compounds transfer through the electrolyte from the anode to the cathode until the concentration thereof in the cathode approaches that in the anode. At this time the cell voltage decreases and the cell must be regenerated. The electronegative component of the cathode compound is then distilled from the cathode to the anode. Polarity of the electrodes is thereby reversed and operation of the cell may be resumed. For example the anode may be $Li_3P$, the cathode $Li_2P_5$ and the electrolyte may be the LiF-LiCl-LiI eutectic.

PATENTED OCT 26 1971 3,615,828
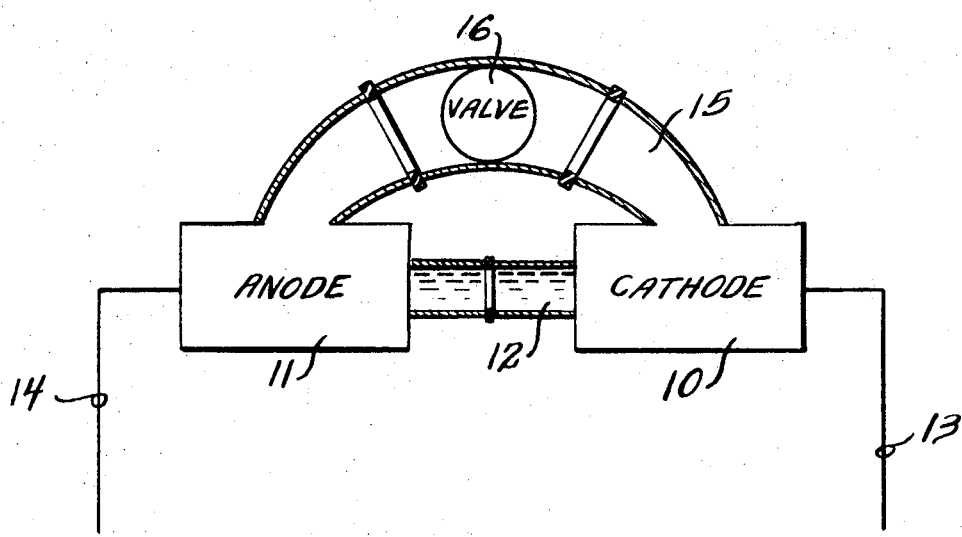
Inventor
Albert K. Fischer
Roland A. Anderson
Attorney

SECONDARY POWER-PRODUCING CELL

CONTRACTUAL ORIGIN OF THE INVENTION

The invention described herein was made in the course of, or under, a contract with the U.S. ATOMIC ENERGY COMMISSION.

BACKGROUND OF THE INVENTION

This invention relates to a device for generating electricity in a sealed, self-contained unit, using only an external heat source. In more detail the invention relates to an electrochemical, power-producing cell and to a method of operating this cell. In still more detail the invention relates to a polarity alternating thermally regenerative, electrochemical, power-producing cell.

In our technologically oriented society, there is an increasing need for compact, convenient, pollution-free electrical power sources and energy-storage devices. A large number of power-source needs, both civilian and military, have gone unfulfilled because of the limited capabilities of presently available batteries and engine generators. In an attempt to satisfy these needs, a great deal of effort has been expended over the last decade in the areas of energy conversion and energy storage. A large portion of the effort has involved electrochemical devices such as fuel cells, metal/air cells, secondary (electrically rechargeable) cells with both aqueous and nonaqueous electrolytes and thermally regenerative cells.

Although a wide variety of electrochemical cells have been suggested for such purposes as long-lived spacecraft power supplies, military communications uses, vehicle propulsion and off-peak energy storage for central stations, none have yet proven completely practical. While development of electrochemical cells for such purposes continues, it is probable that the utility of these cells will, at least for the near future, be restricted to specialized applications where there is a need for power at almost any price. One such specialized utility is under circumstances, probably in a remote location in an emergency situation, where heat is available but electrical energy is also needed. No electrochemical cells presently available are completely satisfactory for this purpose. Accordingly, a search for other cell configurations which are capable of satisfying this need must continue. Of course, any cell designed to fit such a specialized need may in fact have much wider applicability and be useful more generally as noted above.

SUMMARY OF THE INVENTION

An electrochemical power-producing cell according to the present invention includes an anode and a cathode which contain compounds formed of the same two elements in different stoichiometric proportions and an electrolyte separating the electrodes. Regeneration of the cell is by heating the cathode to distill a portion of the electronegative component thereof over to the anode. Operation of the cell can then be continued with reversed polarity of the electrodes.

BRIEF DESCRIPTION OF THE DRAWING

The single FIG. of the drawing is a sketch showing a thermally regenerative, electrochemical cell constructed in accordance with the present invention.

DESCRIPTION OF THE PREFERRED EMBODIMENT

As shown in the drawing a cathode 10 consisting of a phosphorus-rich phosphide —such as $Li_2P_5$— and an anode 11 consisting of a metal-rich phosphide —such as $Li_3P$ —are separated by an electrolyte 12 —such as the LiF-LiCl-LiI eutectic containing 11.7 mol percent LiF, 29.1 mol percent LiC, and 59.2 mol percent LiI melting at 341° C. Current leads 13 and 14 are connected to the electrodes 10 and 11 in conventional fashion. Electrodes 10 and 11 are also placed into communication by passageway 15 provided with a valve 16. Insulation, of course, as necessary is employed.

During current generation valve 16 is closed, ions of the electropositive component of the electrode compounds migrate from anode to cathode and the concentration of this element in the cathode approaches that in the anode. Ultimately the cell voltage decreases to an unusable value and regeneration or "recharging" of the cell is necessary. This is accomplished by opening valve 16 and heating the cathode to distill phosphorous from the cathode to the anode through passageway 15. Condensation of phosphorous in the anode makes it phosphorous rich and the cathode metal rich. Thus, reversal of polarity occurs and the former anode becomes the cathode and the former cathode becomes the anode for continued generation of electric current. Operation of this cell is at about 350° C. and regeneration is at about 800° C.

A wide variety of anode and cathode compounds and of the electrolyte used therewith may be used in practicing this invention. The only requirement on the electropositive element of the electrode compounds is that it be an element that can form two or more binary compounds of different stoichiometries with the electronegative component. In addition to a similar requirement on the electronegative component, it must be distillable at a reasonable temperature. Thus the electropositive component of the electrode compounds may be chromium, iron, lithium, sodium, cadmium, copper or zinc and the electronegative component may be phosphorus, selenium, tellurium, sulfur, arsenic or nitrogen. A wide variety of electrolytes may be used with each anode and cathode pair, the major requirements being that it contains ions of the element that is to be transported through it and that its melting point be sufficiently low to make the cell practical.

Specific examples follow:

| Anode | Cathode | Electrolyte |
|---|---|---|
| $Cr_3P$ | $CrP_2$ | $CrCl_2$ solution in KCl-NaCl |
| $Cd_3P_2$ | $CdP_2$ | $CdCl_2$ in KCl (m.p. 380°-390° C.) |
| $Fe_3P$ | $Fe_2P$ | $FeF_2$ in LiF (m.p. 360° C.) |
| $Zn_3P_2$ | $ZnP_2$ | $ZnCl_2$ (m.p. 262° C.) or $ZnCl_2$-KCl (m.p. 228° C.) |
| $Cu_3P$ | $Cu_2P$ | CuCl in KCl (m.p. 150° C.) |

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. A secondary, power-producing cell comprising an anode and a cathode each consisting of ;binary compounds containing the same two elements in different stoichiometric proportions wherein the electropositive component of the electrode is chromium, iron, lithium, sodium, cadmium, copper or zinc and the electronegative component is phosphorus, selenium, tellurium, sulfur, arsenic, or nitrogen said anode being rich in the electropositive component and said cathode being rich in said electronegative component and an electrolyte that contains ions of the element that is to be transported through it separating the electrodes, said electronegative component being distillable.

2. A secondary power-producing cell according to claim 1 and including means for heating the cathode and for transferring the electronegative component thereof to the anode.

3. A secondary power-producing cell according to claim 1 wherein the anode is $Li_3P$, the cathode is $Li_2P_5$, and the electrolyte is the LiF, LiCl, LiI eutectic.

4. A method of operating a secondary power-producing cell as in claim 1 comprising operating the cell near to discharge, heating the cathode to distill the electronegative component of the cathode material, over to the anode to reverse the polarity of the cell and continuing operation of the cell with reversed polarity of the electrodes.